June 8, 1965 T. H. ELMER ETAL 3,188,217
LIGHT FILTER
Filed Oct. 19, 1962 2 Sheets-Sheet 1

INVENTORS
THOMAS H. ELMER AND
JOHN P. HOXIE
BY
Clarence R. Patty Jr.
ATTORNEY

INVENTORS
THOMAS H. ELMER AND
JOHN P. HOXIE though substantially any conventional method may be employed. Thus, soluble salts such as nitrates may be dissolved in an alcohol solution to form a solution in which a porous glass article is immersed. Porous glass has the composition, in general, of a 96% silica glass except that it contains a large number of submicroscopic pores distributed uniformly throughout. Such pores are normally filled with air, but provide channels for the introduction of fluid materials when the glass is immersed in such fluid. The porous glass is generally produced by heat treating a borosilicate glass to effect a separation of phases, one of which is relatively soluble in acid, and subsequently treating the heat treated glass with acid in accordance with a procedure well known and described in U.S. Patent No. 2,106,744, granted to H. P. Hood and M. E. Nordberg. The porous glass may then be dried, and, after treatment, heated to a temperature sufficient to close the pores and cause consolidation of the glass to a non-porous state. During the course of this heating, the salts present are decomposed to form the corresponding oxide.

3,188,217
LIGHT FILTER
Thomas H. Elmer and John P. Hoxie, Corning, N.Y., assignors to Corning Glass Works, Corning, N.Y., a corporation of New York
Filed Oct. 19, 1962, Ser. No. 231,739
5 Claims. (Cl. 106—52)

This invention relates to a light filter composed of heat resistant glass and capable of altering the apparent color temperature of a light source. In particular, the invention is concerned with an amber colored, transparent high silica glass filter containing additives that decreases the apparent color temperature of an incandescent light source. It finds particular utility in providing corrected illumination for indoor color photography.

In the past, conventional tungsten filament incandescent lamps have been largely relied on to provide illumination for such photography. Generally, this type lamp is operated at a filament temperature such that the color temperature of the light emitted is about 3200° K. Evaporation of tungsten from the filament has made higher temperatures impractical. Consequently, present day indoor color films are designed to be used to best advantage with illumination from a light source exhibiting a color temperature of about 3200° K.

Recently, there has come into popular use a new type of tungsten filament incandescent lamp. The inclusion of a small amount of iodine in this lamp results in a regenerative process in which evaporated tungsten is redeposited on the filament, thus allowing the lamp to be operated at higher temperatures than those heretofore employed. This lamp has found particular utility as a compact camera attachment lamp. The higher operating temperature of this iodine-tungsten lamp offers the advantage of a greater amount of illumination per watt of power consumed.

However, the higher operating temperature results in a color temperature of about 3400° K. which must be corrected to an apparent color temperature of about 3200° K. if it is to be used to best advantage with indoor color film such as type B Kodachrome® film. Such correction may be obtained by means of filters placed over the lens of the camera. However, for convenience when mixing different light sources, it has been found more desirable to render the light source compatible with such film by means of a color-correcting filter placed over the light source.

In order that the combination of lamp and color-correcting filter may not be unduly cumbersome, the filter should be mounted in close proximity to the lamp. As a result, the filter must be sufficiently resistant to thermal shock to withstand the combination of high temperatures created by the lamp and ambient atmospheric conditions. Accordingly, it is advantageous to employ a glass consisting essentially of silica such as fused quartz or a glass of the type known as 96% silica glass.

It is an object of this invention to provide a heat resistant, color-corrective, glass filter. Another object is to provide a method and means of decreasing the color temperature of an iodine-tungsten lamp by about 200° K. A further object is to provide a means of rendering the illumination produced by an iodine-tungsten lamp more compatible with present day indoor color film.

These and other objects are accomplished by means of the present invention which resides in a light filter for decreasing the apparent color temperature of a light source, the filter being composed of high silica glass, preferably a 96% silica glass containing as color-correcting additives, iron and nickel oxides in amounts corresponding to 0.01 to 0.15% by weight $Fe_2O_3$ and 0.015 to 0.2% by weight NiO, on the basis of a 4.3 mm. thickness of the high silica glass and substantially uniformly distributed throughout. This invention further resides in a method of altering the apparent color temperature of illumination from a light source and to the combination of filter and light source.

Determination of the spectral transmission of the filters of the present invention may be made with the aid of a spectrophotometer to obtain transmission curves of the type shown in FIG. 2. On the basis of such determinations, filters possessing color-correcting properties acceptable for purposes of the present invention may be defined in terms of acceptable transmission values at certain critical wavelengths. It has been determined that the desired color-correcting properties required of the filters of the present invention are obtained from a composition of high silica glass, preferably a 96% silica glass, containing, as essential color-correcting additives, NiO and $Fe_2O_3$ and providing a spectrophotometric analysis such that the transmission in terms of selected wavelengths may be defined as: 50 to 70% at 430 m$\mu$, 62 to 76% at 560 m$\mu$ and 78 to 88% at 660 m$\mu$, the percent of transmission at 560 m$\mu$ exceeding the percent of transmission at 430 m$\mu$ by between 8 and 18, and the percent of transmission at 660 m$\mu$ exceeding the percent of transmission at 560 m$\mu$ by between 10 and 18.

The filter thickness may vary considerably, the critical factor being the total amount of color-correcting oxides in the path of illumination. Thicknesses between 3 and 6 mm. are convenient for lamp attachment and a filter thickness of about 4.3 mm. is used herein as a reference standard. Reasonable variations in thickness will not materially affect the color-correcting properties of the filter provided correspondingly corrective variations in oxide additives are made so that the actual amount of color-correcting oxides in the path of illumination remains substantially the same. Likewise, the additives may be restricted to a limited thickness within the filter or introduced in gradient concentration, if desired, provided the distribution laterally is substantially uniform.

In a particular embodiment, the filters of the present invention are used to selectively transmit light from a tungsten-iodine type light source, the color temperature of which approximates that of a black-body radiator at a temperature of about 3400° K. The selective transmission of this light by the filters of the present invention results in a lowering of the apparent color temperature of the transmitted light by about 200° K, that is, to about 3200° K.

The lowering of apparent color temperature from 3400° K. to 3200° K. is typical. A somewhat greater degree of color temperature lowering will occur when light sources higher than 3400° K. are used, and fewer degrees of lowering will occur when light sources of less than 3400° K. are used.

A combination of nickel and iron oxides in the amounts shown is effective to achieve the desired color-correcting properties. However, these additives may, on occasion, result in a translucent glass. It has been determined that the addition of $Al_2O_3$ as a clearing agent, in amounts of between 0.02% and 0.1% on the basis of a 4.3 mm. thickness of the high silica glass, is effective to inhibit this tendency and insure a transparent filter.

The use of 96% silica glass in the production of the filters of the present invention has been found desirable, not only because of its excellent thermal properties, but also because of the facility with which the color-correcting additives may be introduced into the glass, in controlled amounts, while the glass is in a porous state.

The introduction of the color-correcting oxide to a 96% silica glass may be accomplished by means of a leaching and impregnation technique in accordance with the procedures generally described in United States Patent No. 2,303,756. The procedure involves the production of a parent glass article in a conventional manner from a selected borosilicate glass. The article is then thermally treated to separate the glass into two phases, one of which is composed essentially of soluble constituents. The article is then leached with a dilute mineral acid, which removes the soluble phase and leaves a porous, high silica structure retaining its original shape. The porous, high silica structure is then rinsed and impregnated with a solution of the desired salts, dried and heat treated to convert the salts to oxides, close the pores and consolidate the glass.

The impregnation step may be accomplished by immersing the porous glass article in a 0.1 N $HNO_3$ solution containing salts of the desired oxides in suitable concentration. It may be carried out directly after rinsing, this being termed "wet" impregnation, or, alternatively, after the rinsed, porous glass has been dried, this being termed "dry" impregnation. The immersion time may vary according to the concentration of salts in the solution; the greater the concentration of salts in the solution, the shorter the immersion time. The immersion time may also vary according to whether a "wet" or "dry" impregnation process is employed. If a "wet" impregnation is employed, a much greater immersion time must be allowed to obtain a given concentration of additives within the glass than is the case if a "dry" impregnation is employed. This is due to the fact that in a "wet" impregnation, the additives enter the pores by the slow process of diffusion, whereas in a "dry" impregnation, the additives are brought into the pores by means of capillary action. We prefer to employ the "wet" method, which, although slower, allows better control of the impregnation. However, either method may be employed.

In order to further describe the invention, reference is made to the accompanying drawings, wherein.

Figure 1:
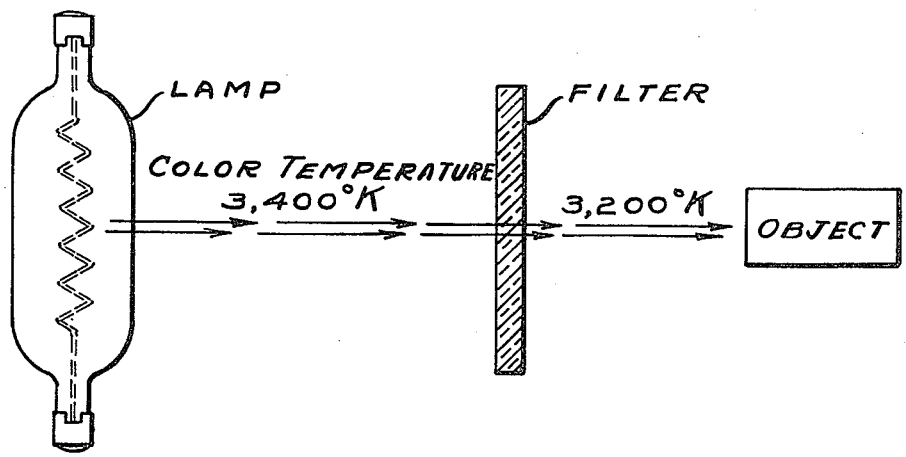
FIG. 1 is a schematic diagram of a method of correcting the apparent color temperature of illumination from an incandescent lamp.

In FIG. 1, the "Lamp" may be the above-mentioned iodine-tungsten lamp. Reference is made to an article entitled "An Iodine Incandescent Lamp With Virtually 100 Percent Lumen Maintenance," by E. G. Zubler and F. A. Mosby, in the Journal of the Illuminating Engineering Society, December 1959, for further details regarding such lamps. Illumination from the lamp has an apparent color temperature of about 3400° K. although this may vary somewhat with operating conditions and construction. In accordance with our invention, the "Filter" of FIG. 1 selectively transmits the illumination, thereby correcting or decreasing the apparent color temperature by about 200° K., that is, to about 3200° K.

By way of further illustrating the invention and the manner in which it may be practiced, the following specific examples are set forth:

*Table 1*

| Impregnating Solution (wt. of salts per 100 ml. of 0.1 N $HNO_3$) | | | Immersion time (Minutes) |
|---|---|---|---|
| $Fe(NO_3)_3 \cdot 9H_2O$ | $Ni(NO_3)_2 \cdot 6H_2O$ | $Al(NO_3)_3 \cdot 9H_2O$ | |
| Ex. 1 | 2.0 | 2.0 | 2.0 | 60 |
| Ex. 2 | 1.75 | 1.75 | 1.75 | 60 |
| Ex. 3 | 7.0 | 7.0 | 7.0 | 7 |
| Ex. 4 | 7.0 | 7.0 | 7.0 | 10 |

In each case, the impregnation solution consisted of a 0.1 N $HNO_3$ solution containing the indicated amount of iron, nickel and aluminum salts. The wet porous glass was immersed in the impregnating solution for a given period of time, at room temperature, after which it was transferred into 0.1 N $HNO_3$ and held for about two minutes. The glass was then rinsed with water to remove any residual coloring matter from the surface, and dried at room temperature.

The air dried glass was then heated to about 950° C. in air and held for about 1 hour, then heated to about 1250° C. and held for about ½ hour to convert the salts to their oxides, close the pores and consolidate the glass.

By way of relating the above solutions to oxide content in a filter, a 4.3 mm. thick glass containing a maximum or equilibrium amount of solution 1 will, as calculated from the solution concentration, contain uniformly dispersed in the glass 0.10% $Fe_2O_3$ and 0.13% NiO. Inasmuch as equilibrium conditions are not normally completely achieved in the short schedules desirable for commercial impregnating purposes, filters are customarily and conveniently defined in terms of transmission characteristics.

Figure 2:
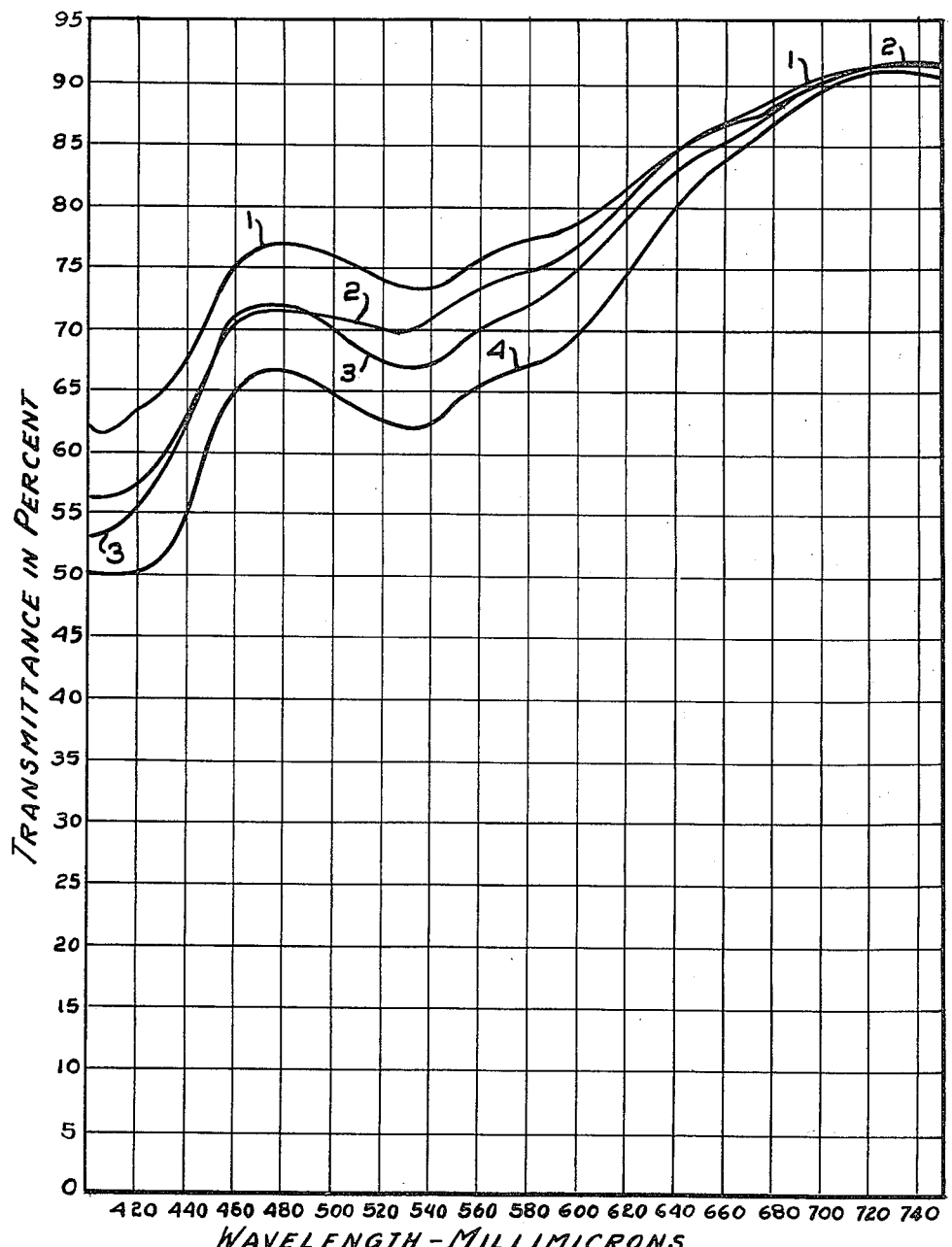
FIG. 2 is a graphical illustration of the color transmission characteristics of filters of the present invention wherein color is indicated in terms of wavelength.

Transmission characteristics of the filters corresponding to the examples of Table I are shown in FIG. 2 wherein transmission is plotted along the vertical axis, and wavelength of the transmitted light is plotted along the horizontal axis. Curves 1, 2, 3 and 4 of FIG. 1 correspond to the filters of Examples 1, 2, 3 and 4, respectively, of Table I above. Each curve shows the precentage of transmission for the corresponding filter at any selected wavelength of radiation. The data from which the curves were plotted were obtained from a G.E. Model No. 5962004G25 Recording Spectrophotometer.

As will be evident to those skilled in the art, many variations and modifications can be practiced within the scope of the description and claims to this invention. For example, the heat-resistant amber filters of the present invention may be used as a protective enclosure for outdoor floodlights, and the like, where thermal shock may result from rain, etc. falling on the hot lamp, and where the color of the transmitted light is desirable for its esthetic properties. Furthermore, it is within the scope of the present invention to use the novel light filter disclosed herein to form the envelope of a high temperature compact lamp, thus eliminating the need for an extra component.

What is claimed is:

1. A light transmitting filter formed from a high silica glass containing as essential color-correcting additives NiO and $Fe_2O_3$ in amounts equivalent to between 0.01 and 0.2% by weight of NiO and between 0.01 and 0.15% by weight of $Fe_2O_3$ based on a uniformly impregnated high silica glass of 4.3 mm. thickness, said filter providing a spectral transmission curve wherein the transmission in terms of selected wavelengths is 50 to 70% at 430 m$\mu$, 62 to 76% at 560 m$\mu$ and 78 to 88% at 660 m$\mu$, and wherein the percent transmission at 560 m$\mu$ exceeds the percent transmission at 430 m$\mu$ by 8 to 18, and the percent transmission at 660 m$\mu$ exceeds the percent transmission at 560 m$\mu$ by 10 to 18.

2. A light filter in accordance with claim 1 wherein said high silica glass is 96% silica glass.

3. A light transmitting filter formed from 96% silica glass containing color-correcting additives consisting of, NiO and $Fe_2O_3$ and as a clearing agent additive, $Al_2O_3$, said additives being present in amounts equivalent to between 0.01 and 0.2% by weight of NiO and between 0.01 and 0.15% by weight of $Fe_2O_3$ and between 0.02 and 0.1% by weight of $Al_2O_3$ based on a uniformly impregnated high silica glass of 4.3 mm. thickness.

4. A method of altering the apparent color temperature of an incandescent light source from about 3400° K. to about 3200° K. which comprises transmitting radiation from said light source through a selectively transmitting light filter formed from 96% silica glass containing as essential color-correcting additives, NiO and $Fe_2O_3$, and as a clearing agent additive $Al_2O_3$, said additives being present in amounts equivalent to between 0.01 and 0.2% by weight of NiO and between 0.01 and 0.15% by weight of $Fe_2O_3$ and between 0.02 and 0.1% by weight of $Al_2O_3$, based on a uniformly impregnated 96% silica glass of 4.3 mm. thickness.

5. A light transmitting filter formed from a 96% silica glass containing color-correcting additives consisting of NiO and $Fe_2O_3$ in proportions such that the filter is capable of altering the apparent color temperature of an incandescent light source from about 3400° K. to about 3200° K.

References Cited by the Examiner
UNITED STATES PATENTS

| | | | |
|---|---|---|---|
| 1,122,066 | 12/14 | Brady | 106—52 |
| 2,340,013 | 1/44 | Nordberg et al. | 106—52 |
| 2,779,668 | 1/57 | Nordberg | 106—47 |
| 3,093,319 | 6/63 | Gamain | 240—1.1 |

OTHER REFERENCES

Handbook of Chemistry & Physics, 43rd edition (1961), Chemical Rubber Publ. Co., Cleveland, Ohio (pages 3057 and 3065).

TOBIAS E. LEVOW, *Primary Examiner.*